(12) United States Patent
Pona

(10) Patent No.: US 10,973,609 B2
(45) Date of Patent: Apr. 13, 2021

(54) VIBRATING CROWN AND BRIDGE REMOVER

(71) Applicant: Zbigniew Pona, Windsor (CA)

(72) Inventor: Zbigniew Pona, Windsor (CA)

( * ) Notice: Subject to any disclaimer, the term of this patent is extended or adjusted under 35 U.S.C. 154(b) by 165 days.

(21) Appl. No.: 16/044,618

(22) Filed: Jul. 25, 2018

(65) Prior Publication Data
US 2020/0030060 A1    Jan. 30, 2020

(51) Int. Cl.
*A61C 3/16* (2006.01)
(52) U.S. Cl.
CPC .................................. *A61C 3/166* (2013.01)
(58) Field of Classification Search
CPC .. A61C 3/166; A61C 3/14; A61C 3/16; B25B 5/04; A61B 7/282
See application file for complete search history.

(56) References Cited

U.S. PATENT DOCUMENTS

| | | | | |
|---|---|---|---|---|
| 491,519 | A | * | 2/1893 | Blake ....................... A61C 3/14 433/159 |
| 560,419 | A | | 5/1896 | Markowsky |
| 1,380,726 | A | | 6/1921 | Lurie |
| 1,498,285 | A | | 6/1924 | Lorenz |
| 1,634,058 | A | | 6/1927 | Teragawa |
| 1,858,080 | A | | 5/1932 | Flagstad et al. |
| 2,430,271 | A | * | 11/1947 | Brantley ................... A61C 3/14 433/154 |
| 2,627,113 | A | | 2/1953 | Moray |
| 3,754,331 | A | | 8/1973 | Agnone |
| 3,827,148 | A | | 8/1974 | Diliberto |
| 4,831,905 | A | * | 5/1989 | Murchison ................ B25B 5/04 269/254 CS |
| 4,923,399 | A | * | 5/1990 | Funderburg, Jr. ....... A61C 3/16 433/153 |
| 5,220,856 | A | * | 6/1993 | Eggert ...................... B25B 7/06 30/254 |
| 5,257,558 | A | | 11/1993 | Farzin-Nia et al. |
| 5,320,532 | A | | 6/1994 | Farzin-Nia et al. |
| 5,451,161 | A | | 9/1995 | Sharp |
| 5,547,380 | A | | 8/1996 | Goodman |
| 5,733,119 | A | | 3/1998 | Carr |

(Continued)

FOREIGN PATENT DOCUMENTS

| | | |
|---|---|---|
| DE | 4109988 A1 | 3/1991 |
| DE | 4109988 A1 | 10/1992 |
| WO | 2008003144 A1 | 1/2008 |

OTHER PUBLICATIONS

Definition of coterminus retrieved from https://www.dictionary.com/browse/coterminous (Year: 2020).*

*Primary Examiner* — Heidi M Eide
(74) *Attorney, Agent, or Firm* — Warn Partners, P.C.

(57) ABSTRACT

A dental crown removal apparatus is provided, including a handle for placement in an operator's hand, an elongated post projecting along a first axis, the post being connected for reciprocal motion with respect to the handle, a motor in the handle for moving the post, a tool adapter connected with the post opposite the handle, the tool adapter having an extension arm extending away from the handle with a pivot arm connected with the extension arm and spaced from the handle, and first and second opposing jaws having claw ends spring biased together, the first and second jaws having independent and unitary pivotal connection with the pivot arm.

22 Claims, 11 Drawing Sheets

(56) References Cited

U.S. PATENT DOCUMENTS

| | | |
|---|---|---|
| 6,190,167 B1 | 2/2001 | Sharp |
| 6,282,995 B1 | 9/2001 | Lin |
| 6,413,088 B1 | 7/2002 | Kawaguchi |
| 7,165,970 B2 | 1/2007 | Anderson |
| 8,162,661 B2 | 4/2012 | Pona |
| 2003/0003418 A1 | 1/2003 | Kumabe |
| 2005/0272006 A1 | 12/2005 | Rosenberg |
| 2008/0248446 A1* | 10/2008 | Pona ............... A61C 3/166 433/159 |
| 2013/0306543 A1* | 11/2013 | Beisser ............ A61M 5/1414 210/321.6 |

* cited by examiner

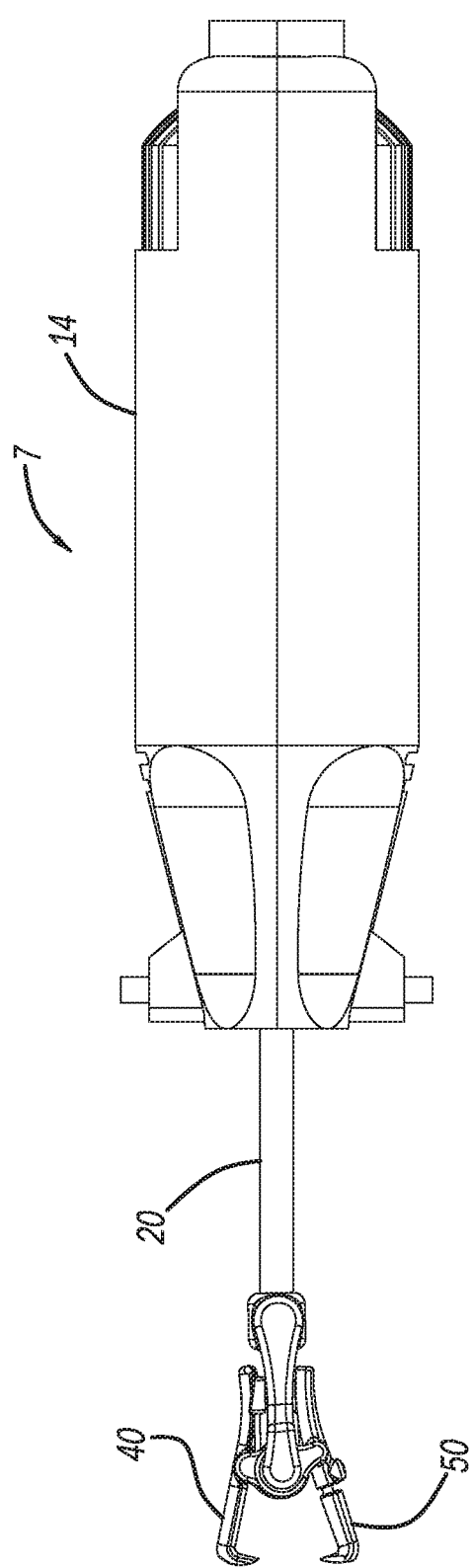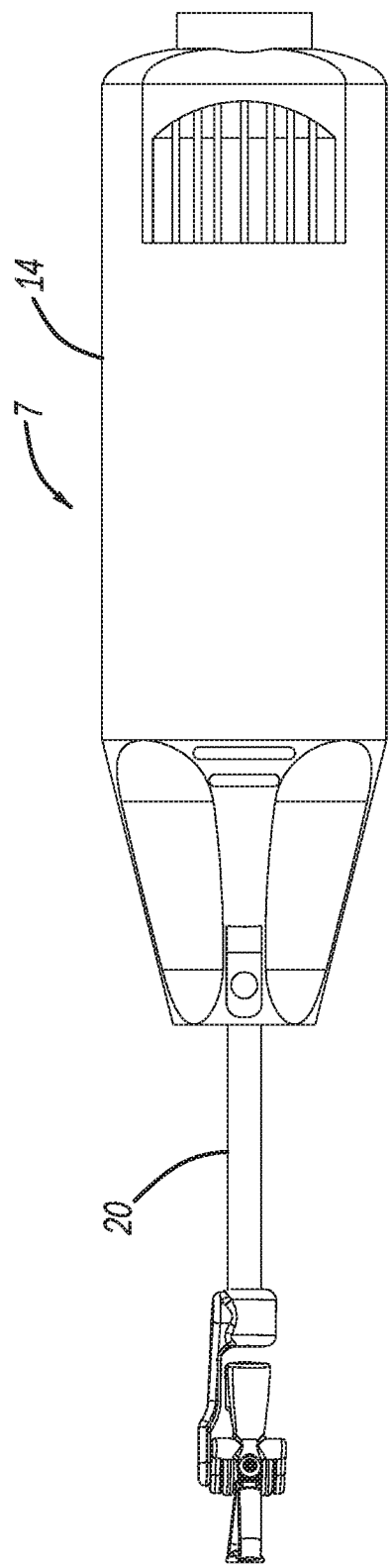

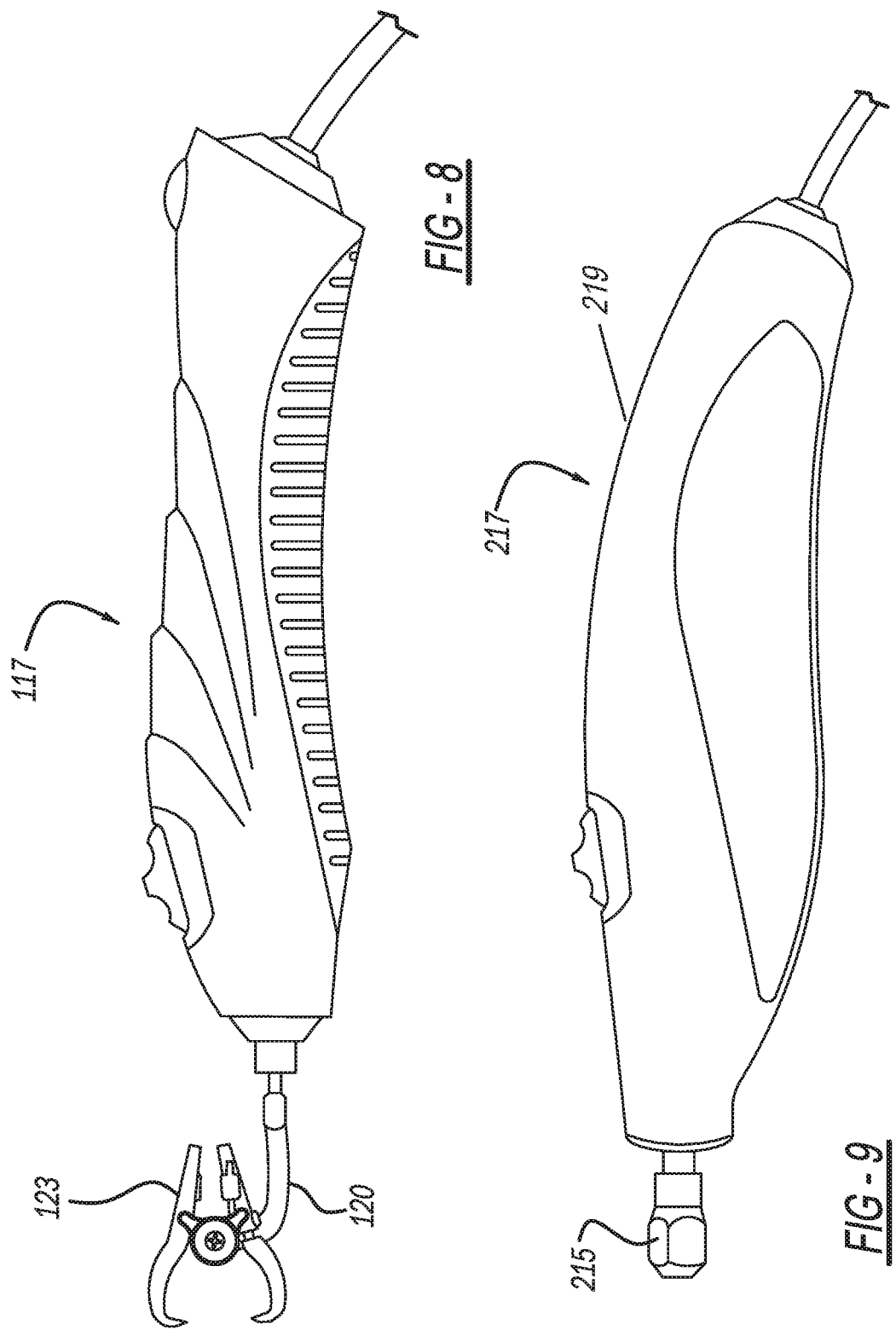

VIBRATING CROWN AND BRIDGE REMOVER

FIELD OF THE INVENTION

In one of its aspects, the present inventions relates to a vibrating dental tool for the removal of crowns and bridges. The term dental "crown" relates to removal tools and apparatuses utilized for the removal of dental crowns or dental bridges and other like dental structures.

BACKGROUND OF THE INVENTION

Vibrating dental tools and, in particular, ultrasonic dental tools are known. U.S. Pat. No. 5,320,532 (Farzin-Nia et al.) teaches an ultrasonic tool for fracturing the interface between dental structures and, specifically, for the removal of orthodontic bands or brackets from teeth after the completion of treatment. The working tip of the tool may be wedge-shaped, flat or needle shaped. In one embodiment, a pair of spaced projections are disposed on either side of an engaging surface to provide a receiving area for the bracket to minimize slipping off. In use, the tip of the tool is placed against a bracket and ultrasonic energy is transferred through the bracket to the adhesive layer.

U.S. Pat. No. 5,733,119 (Carr) teaches a microsurgical drill bit, which can be connected to an ultrasonic transducer. The drilling tips are angled and may have bent end portions to permit the tool to be held at a comfortable angle.

While drilling devices and simple devices for the removal of adhesively connected dental structures are known, there is a need for a dental tool adapted for the removal of crowns and bridges.

The crowning and bridging of teeth is a common practice in dentistry. There are a number of indications for crowns and bridges. Some of the more common indications are: heavily restored teeth with little of the original teeth left; following root canal treatments; and bridges for the replacement of missing teeth. Crowns and bridges may also be used for aesthetic reasons.

When a tooth is prepared for a crown, the practitioner removes or shaves off the surface of the tooth to a depth of approximately 1.5 millimeter (mm). The practitioner generally then cements a temporary crown to the tooth. The practitioner then generally awaits lab work on the tooth, before cementing in a permanent crown.

There are many instances where a practitioner must remove a crown or bridge. One common instance is the removal of a temporary crown. This may prove particularly challenging where the temporary crown fits tightly over the original tooth. Another common instance is the removal of a permanent crown that has been temporarily cemented. This might occur, for example, where the practitioner wishes to obtain approval of the crown from the patient before permanently securing it. This might also occur where the practitioner wishes to ensure that tooth sensitivity will subside before permanently securing a crown.

Other common instances may arise after a crown has been permanently secured. For example, removal of a crown is required where there is a cavity underneath it and the practitioner does not wish to cut the crown to provide treatment. Similarly, a crown may need to be removed where it is necessary to perform a root canal on the underlying tooth. Yet another instance might be where one crown of a bridge becomes loose and the practitioner must remove the other crowns of the bridge in order to re-cement the bridge.

Existing crown removal tools generally involve the application of a blunt force to the crown, which often results in broken or fractured crowns or teeth. This can add complexity and expense to a dental procedure and, in addition, may cause additional discomfort to a patient. The inventor is aware of an ultrasonic crown removal tool, the ATD Automatic Crown & Bridge Remover by J. Morita, USA, Inc. This tool consists of ultrasonic steel string arranged as a loop and a pneumatic hook that attaches to a hand piece that causes slow movement of the hook. The steel string, while designed to assist with separating the crown from the root, suffers from a number of drawbacks. The steel string is difficult to position if the teeth are close together. Further, if the crown-tooth interface is smooth, the string will not catch at this position. The string also has trouble penetrating the crown-tooth junction. Finally, due to the application of pressure on one side of the crown or tooth-crown junction, the crown almost invariably breaks during the removal procedure, which adds to the complexity and expense of the procedure.

In the most recent chronicles of development of dental crown removal tools, U.S. Pat. No. 8,162,661 (Pona) brought forth a dental crown removal with substantial advantages over the prior art. Pona provides a dental crown removal tool with superior vertical grip on the crown on the tooth, while at the same time minimizing the transverse (or horizontal) force placed on the crown. Explained in a different manner, the Pona dental crown removal tool can apply superior pull force on the crown without slipping off the dental structure without horizontally crushing the underlying tooth underneath the crown.

It is desirable to provide a dental crown removal tool that exceeds the advantages brought forth by Pona and other dental crown removal tools currently known.

SUMMARY OF THE INVENTION

To make manifest the above noted and other gainful desires a revelation of the present invention is brought forth. In one preferred embodiment, the present invention endows a freedom of a dental crown removal apparatus having a handle for placement in an operator's hand. An elongated post projecting along a first axis is connected for reciprocal motion with respect to the handle. A motor is provided in the handle for moving the post. A tool adaptor is connected with the post generally opposite the handle. The tool adaptor has a saddle for placement on the post. The tool adaptor has an extension arm extending away from the handle. The tool adaptor has a pivot arm connected with the extension arm and spaced from the handle. First and second jaws are provided having independent and unitary pivotal connection with the pivot arm. Claw ends of the jaws are spring biased together.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a top plan view of a preferred embodiment dental vibrating crown and bridge remover (herein after referred to as the dental crown remover) according to the present invention;

FIG. 2 is a side plan view of the dental crown remover shown in FIG. 1;

FIG. 8 is a perspective view of an alternate preferred embodiment dental crown remover according to the present invention;

FIG. 9 is a perspective view of a handle of an alternate preferred embodiment dental crown remover according to the present invention;

DETAILED DESCRIPTION OF THE PREFERRED EMBODIMENTS

Figure 3:
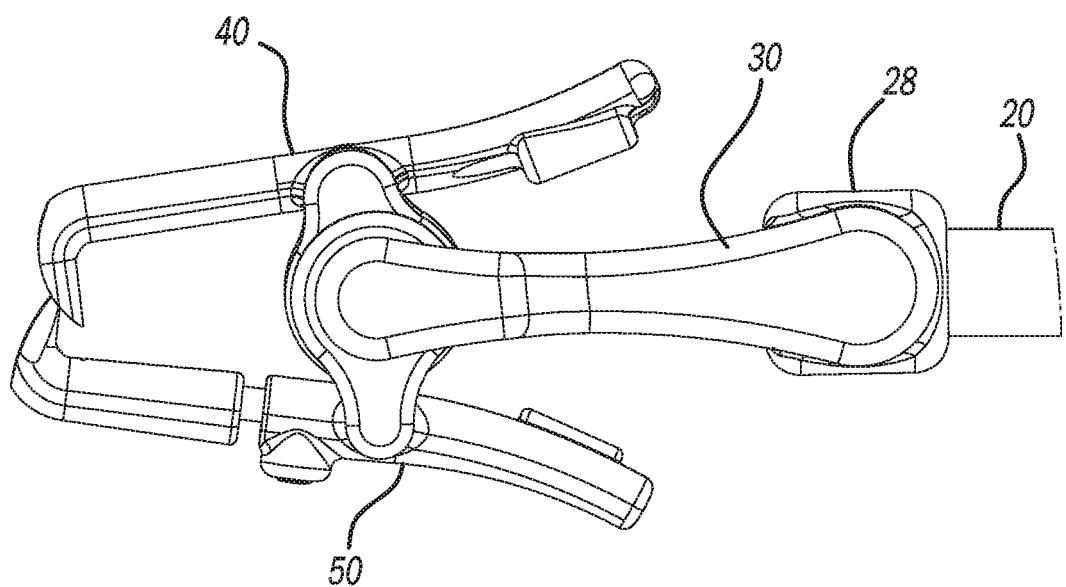
FIG. 3 is an enlargement of the jaws of the dental crown remover shown in FIG. 1 with the jaws shown in a closed position.
Figure 4:
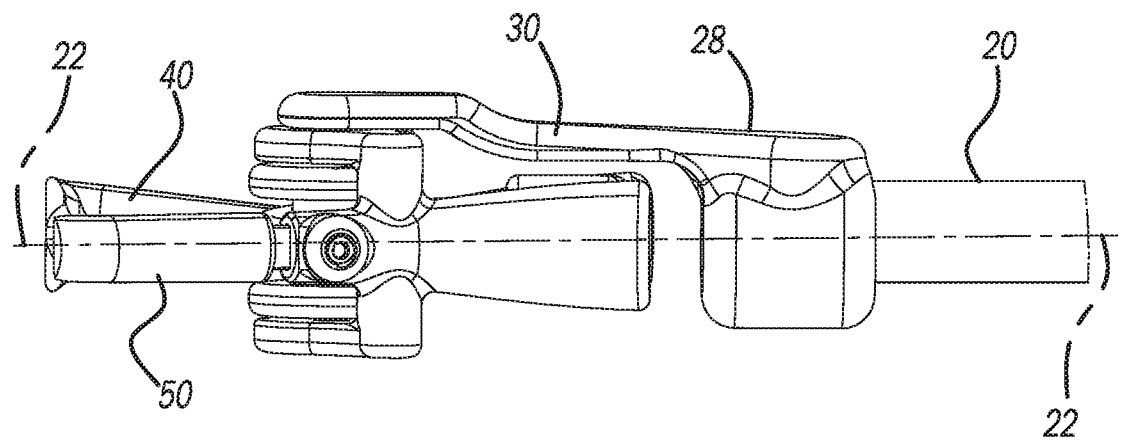
FIG. 4 is an enlargement of the jaws of the dental crown remover jaws shown in FIG. 2.
Figure 5:
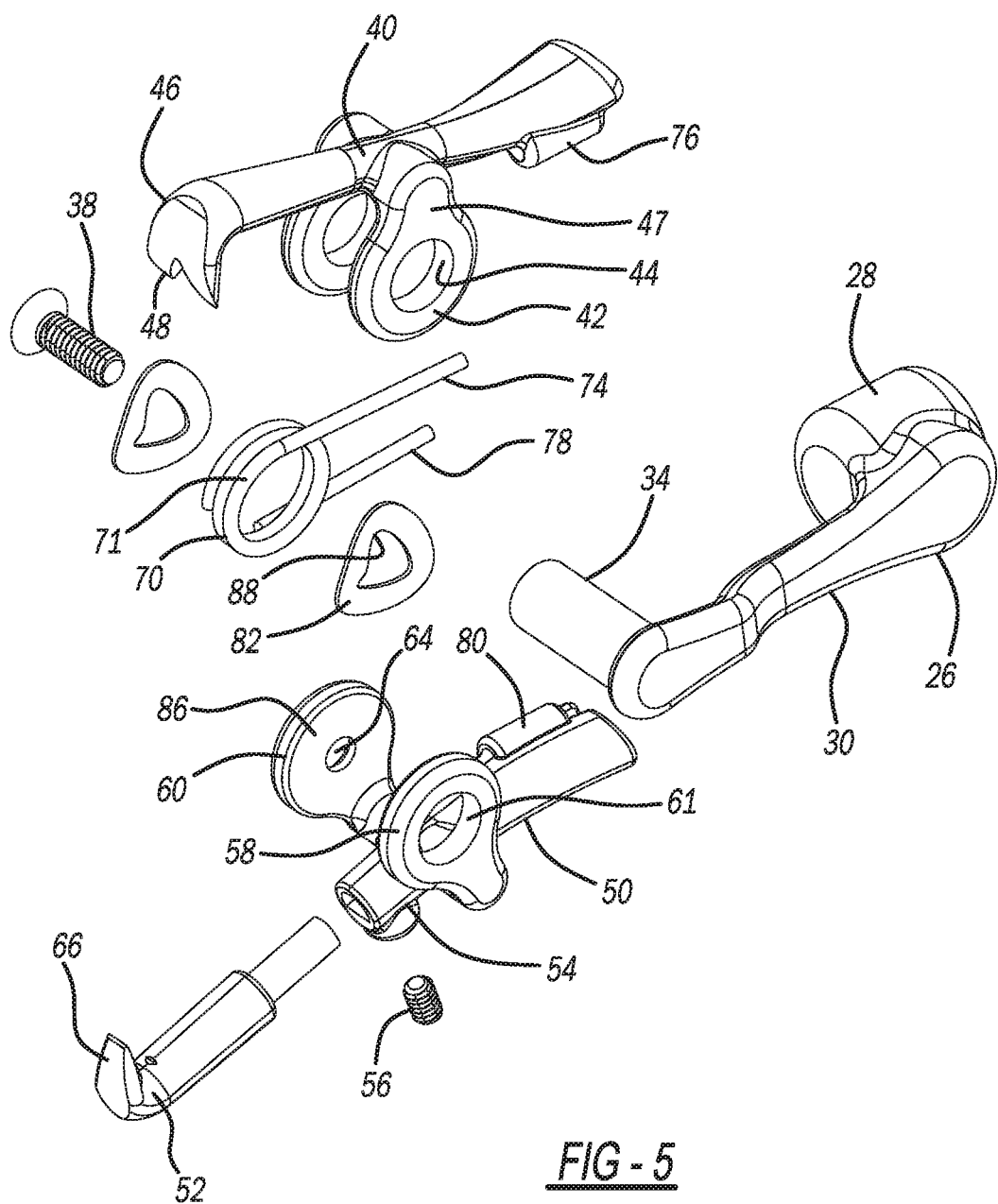
FIG. 5 is an enlarged exploded view of the dental crown remover jaws shown in FIG. 1.
Figure 6:
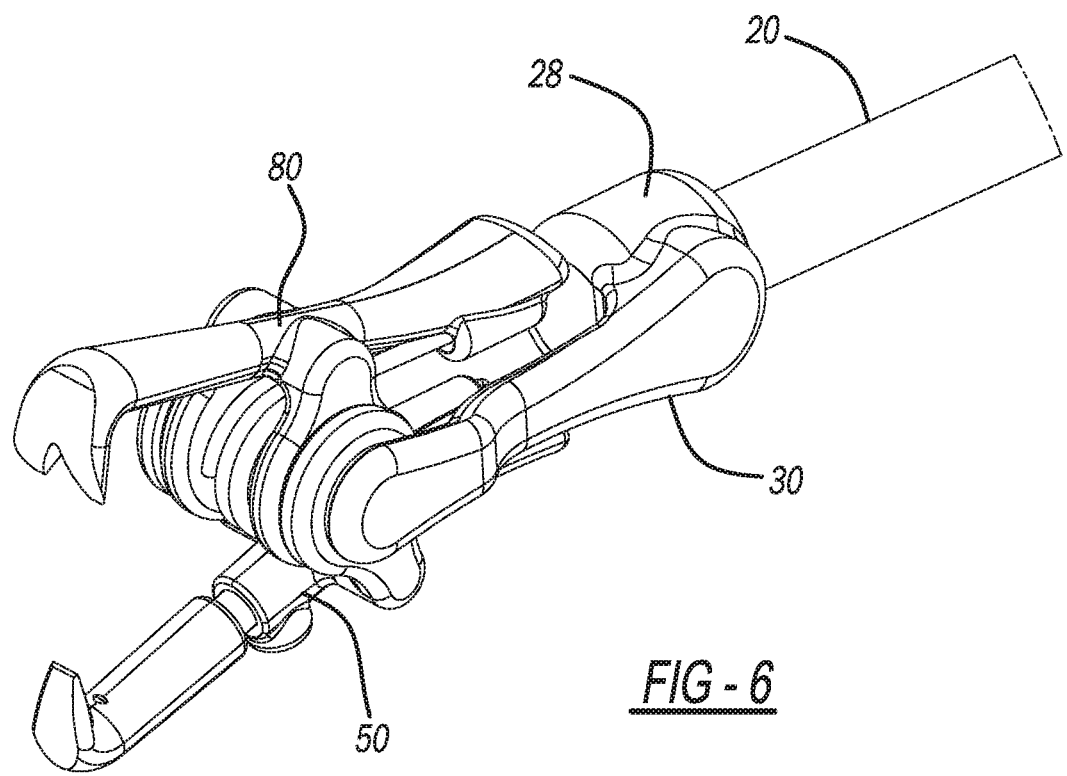
FIG. 6 is an enlarged perspective view of the dental crown remover jaws shown in FIG. 1.
Figure 7:
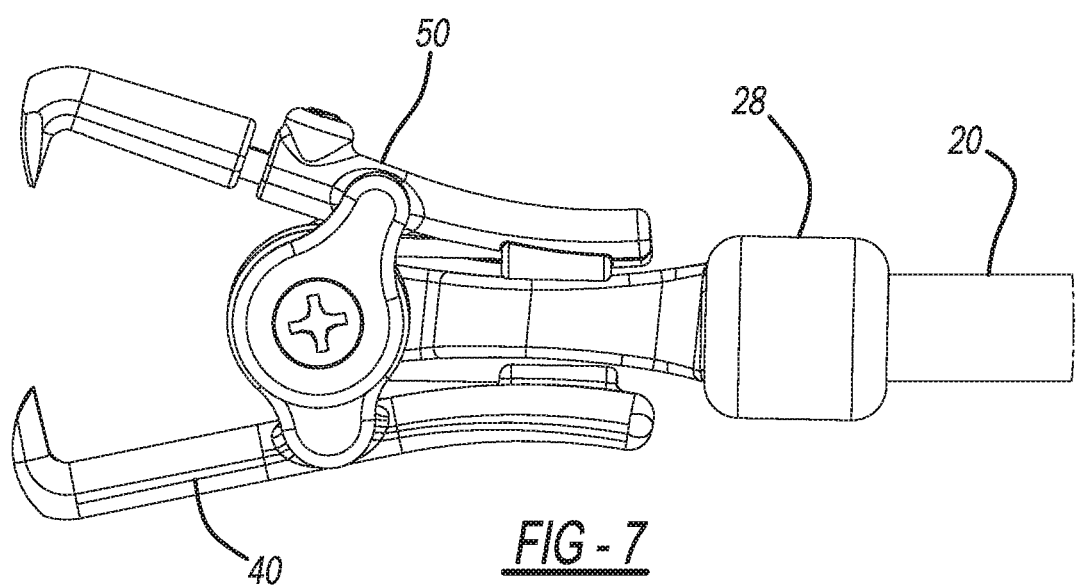
FIG. 7 is a reverse view of the dental crown remover shown in FIG. 3 with the jaws in an open position.
Figure 10:
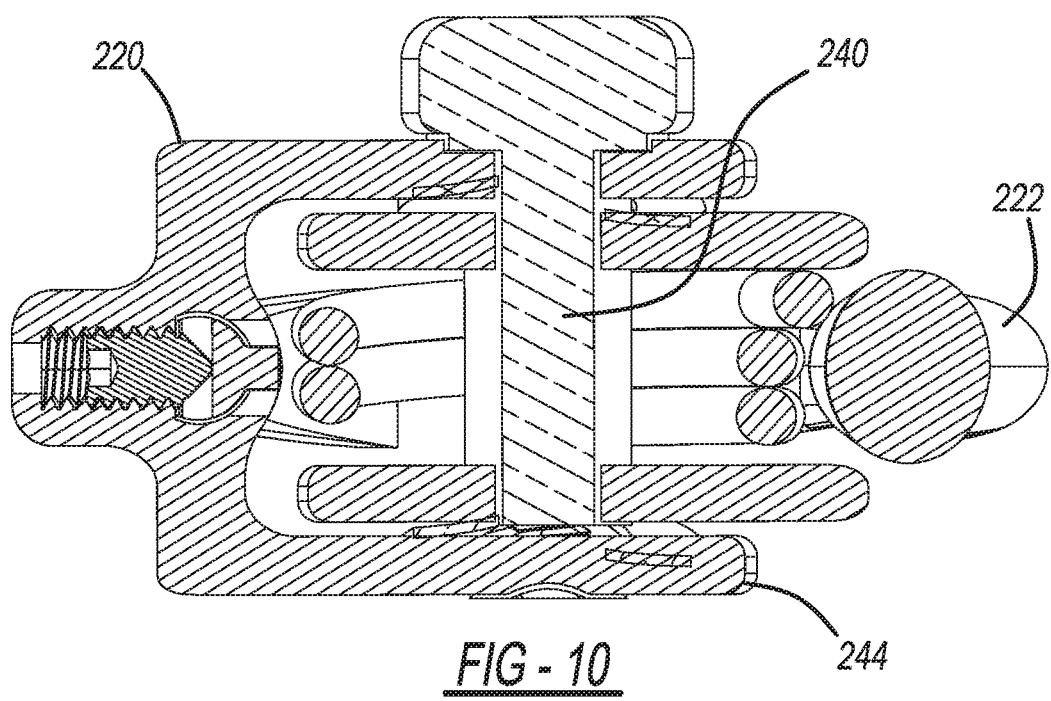
FIG. 10 is a sectional view of the jaws of a dental crown remover as shown along lines 10-10 in FIG. 13.
Figure 11:
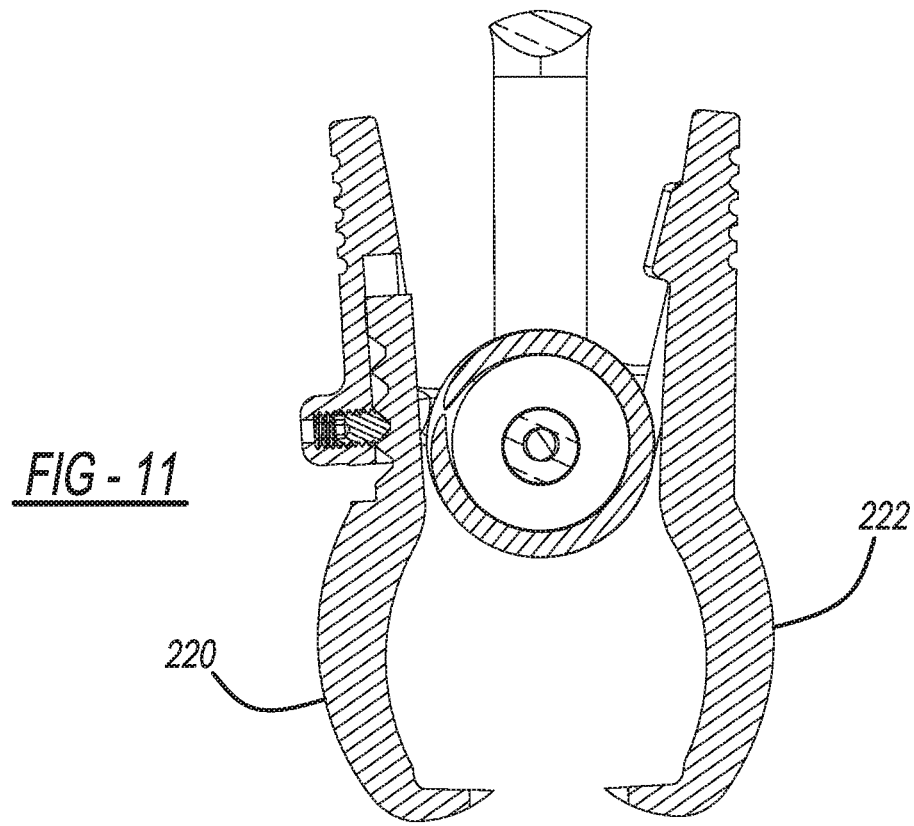
FIG. 11 is a sectional view of the jaws of the dental crown remover along lines 11-11 of FIG. 14.
Figure 12:
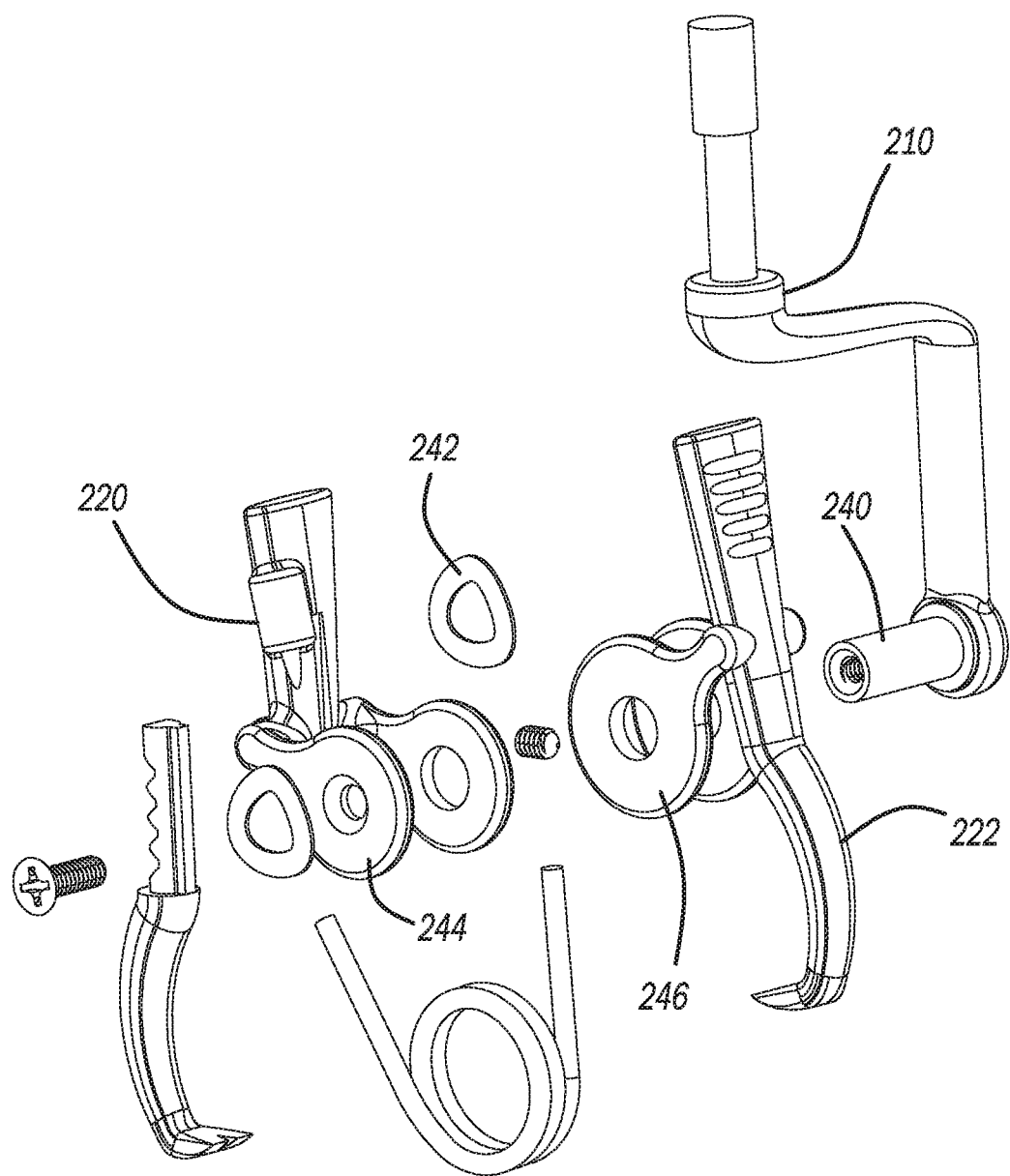
FIG. 12 is a exploded view of the claws of an alternate preferred embodiment dental crown remover.
Figure 13:
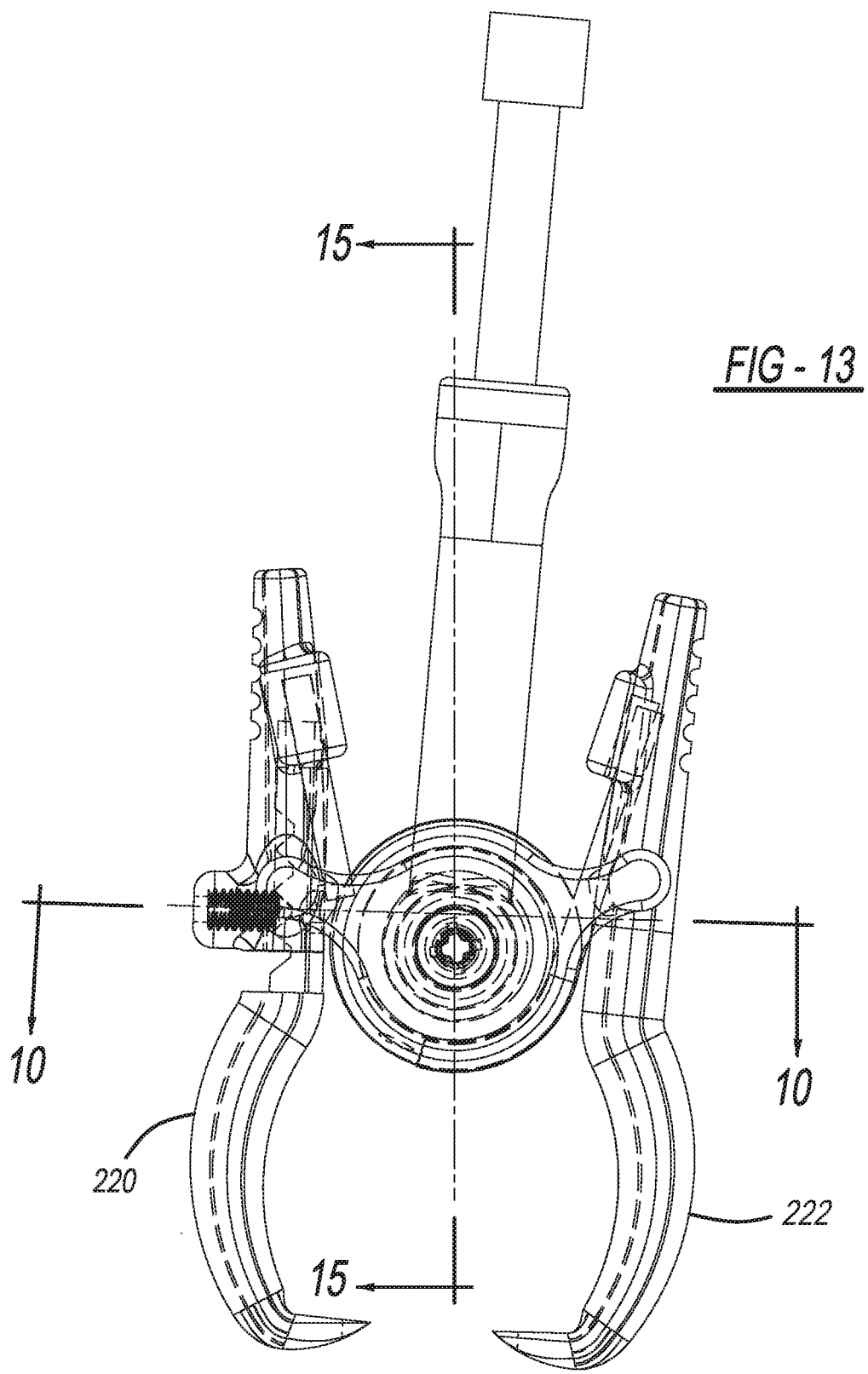
FIG. 13 is a side elevational view of the jaws of the dental crown remover shown in FIGS. 10-12.

The following description of the preferred embodiment(s) is merely exemplary in nature and is in no way intended to limit the invention, its application, or uses.

Referring to FIGS. 1-7, a preferred embodiment dental crown remover 7 is provided. The dental crown remover 7 has a handle 14 for placement in an operator's hand. Preferably, handle 14 contains a motorized vibrator, preferably in the form of a vibrating alternating transducer for generating reciprocal or vibrating motion. A power source for the ultrasonic transducer is typically provided by a externally connected power source housed in handle 14. In an alternate embodiment, handle 14 may be powered by batteries. Vibratory dental handles or transducer heads are commonly used in the art in conjunction with cleaning tips. The particular configuration of the handle is not restricted and is within the purview of a person skilled in the art. Preferably, a manually operable control button or buttons are provided on handle 14 for powering the crown remover 7 on and off and for varying the frequency amplitude of vibration along a range of settings. The number of frequency settings is not particularly restricted and is within the purview of a person skilled in the art. Rather than discrete frequency settings, the frequency may be adjustable along a spectrum. It can be set from 0 vibrations to 110 Hz (6600 per minute) with a pulse travel of 1 mm. The pulse travel and power of the vibration can also be adjustable along discrete settings or can be made continually adjustable. Typically a dental professional will start at 0 and increase the frequency to maximum setting.

An elongated post 20 is provided. Projecting along a first axis 22, post 20 is connected for reciprocal motion with respect to the handle 14 along the first axis 22. A tool adaptor 26 is connected on the post 20 along an end of the post 20 generally opposite the handle 14. Tool adaptor 26 has a cylindrical-shaped saddle 28. Due to its cylindrical shape, the saddle 28 can rotate on the post 20. Tool adaptor 26 has an extension arm 30 extending from the saddle 28. Perpendicularly connected to the extension arm 30 is a pivot arm 34 being generally cylindrical in shape. On its far end, the extension arm 34 has a drilled opening which is threaded for reception of a flat head machine screw 38. An upper jaw 40 is provide having a pivotal connection with the pivot arm 34. The upper jaw 40 is typically fabricated from stainless steel or titanium. The upper jaw 40 has twin eyelets 42. The eyelets 42 have a cylindrical aperture 44 to allow pivotal connection on the pivot arm 34. A claw end 46 of the upper jaw 40 has two wedge-shaped teeth 48. The jaw 40 pivots in a plane that is parallel and co-terminus with the first axis 22.

Opposing the upper jaw 40 is a lower jaw 50. Lower jaw 50 is an adjustable length jaw having a claw 52 insertable into a main body 54 for the lower jaw. The claw's position with respect to the main body 54 is set by utilization of a set screw 56. The lower jaw 50 also has twin eyelets 58 and 60. Eyelet 58 is pivotally mounted upon pivot arm 34 by its cylindrical aperture 61. The opposite eyelet 60 is held to the pivot post 34 by virtue of eyelet by being pivotally mounted on the machine screw 38 via its aperture 64. The twin eyelets 42 (of the upper jaw) are laterally fitted within the eyelets of the lower jaw. The lower jaw claw 52 has a tooth 66 that juxtaposes two teeth 48 of the upper jaw. Both the upper jaw 40 and the lower jaw 50 pivot in a plane that intersects the longitudinal and vibrational axis of the post 8. A torsional spring 70 is provided to compliantly bias the teeth 66 and 48 of the lower and upper jaws, respectively together. The spring 70 is typically made out of a 316 stainless steel material. Torsion spring 70 has a coil body 71 encircling the pivot arm 34. Torsion spring 70 has a spring arm 74 captured in a nest 76 of the upper jaw. The spring arm 74 typically is laterally restrained by the nest 76. The spring 70 also has another leg 78 captured within the nest 80 provided by the lower jaw, and additionally tends to laterally press against the nest 80 to ensure its capture within. A wave washer spring 82 is captured between a surface 47 of the upper jaw eyelet and an inner surface 86 of eyelet 58. The wave washer has an aperture 88 allowing for its placement over pivot arm 34. In a similar manner, a wave washer 82 is placed between the eyelets 60 and 42.

Figure 17:
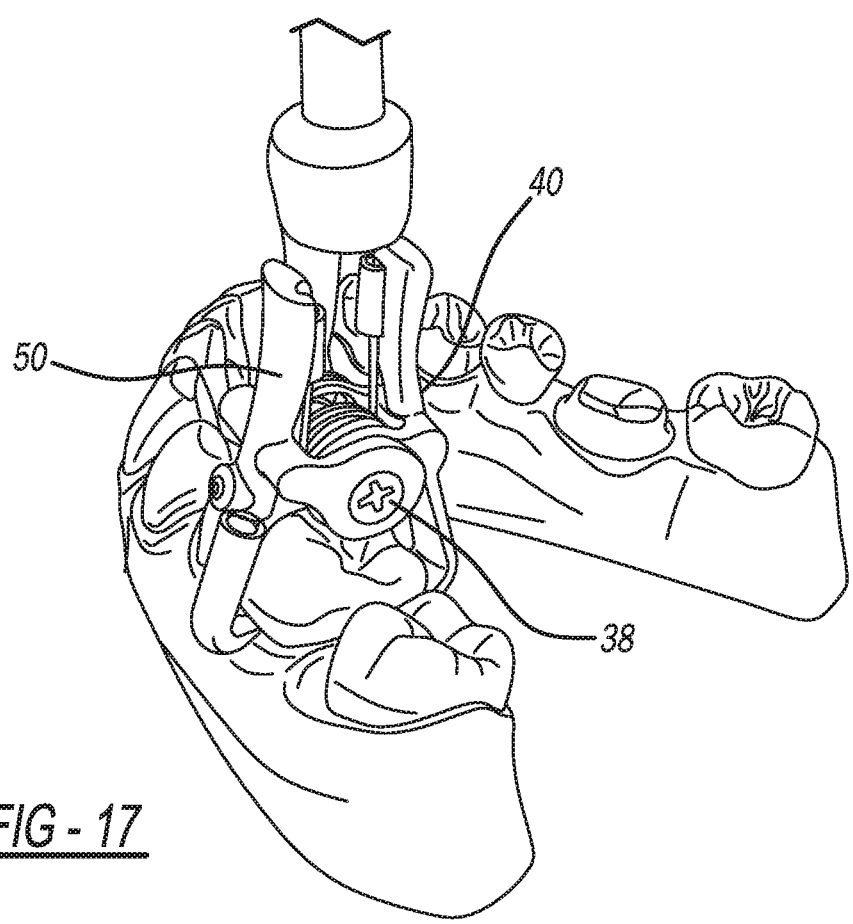
FIG. 17 is an operational view of the dental crown remover shown in FIG. 1 in the environment of a patient's mouth.

In operation, a dentist compresses a rearward end of the jaws to allow them to open up for placement over the dental structures (see FIG. 17). The length of the lower jaw is adjusted to customize the fitting. The dentist uses a switch on the handle to activate the motor causing the post to be vibrationally accelerated upwards, lifting off the dental structures. Referring to FIG. 8, an embodiment of the present invention shows 117 which has a curved post 120. The jaw structure 123 is essentially identical as that previously described.

Figure 14:
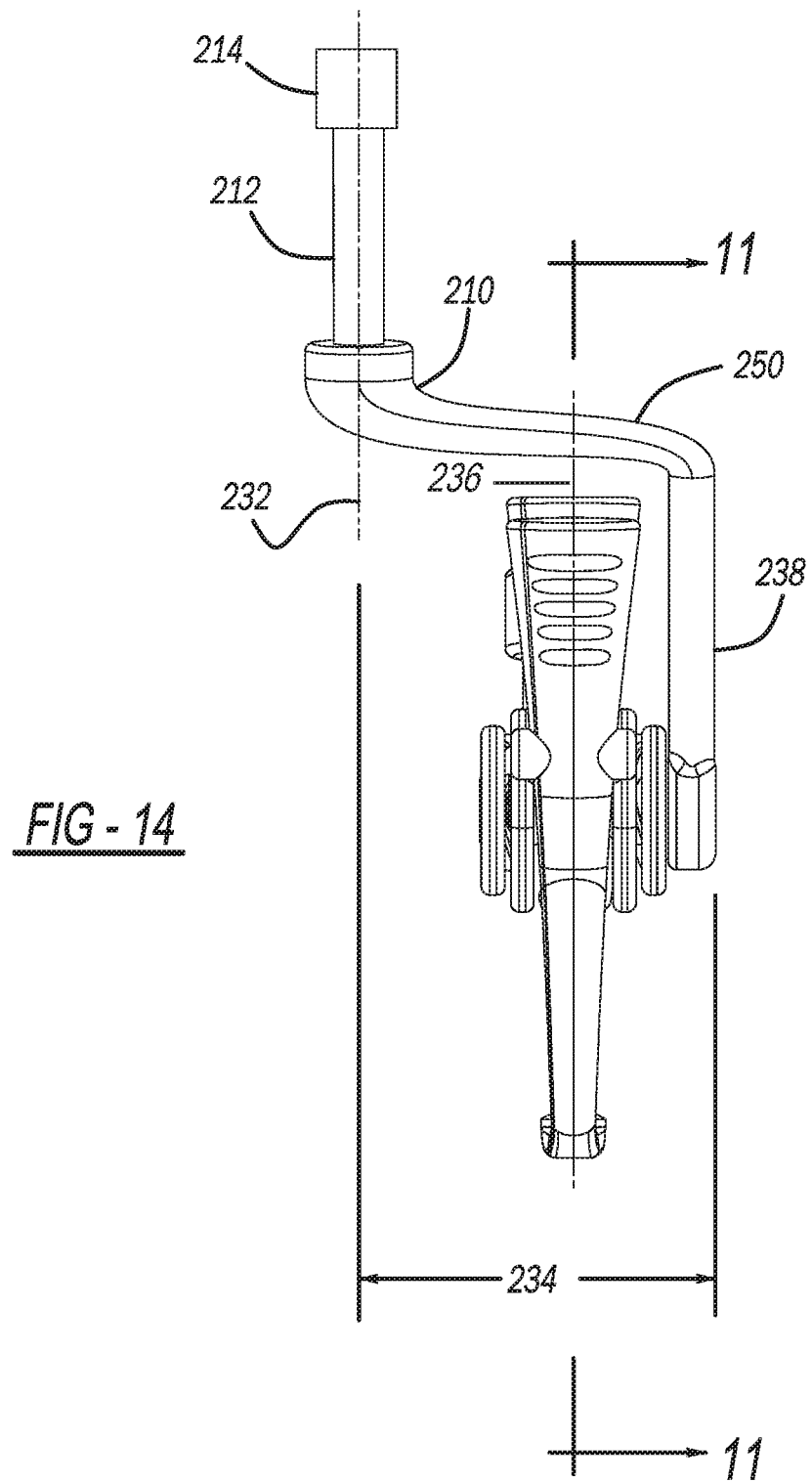
FIG. 14 is a side elevational view of the jaws of the dental crown remover shown in FIGS. 10-16.
Figure 15:
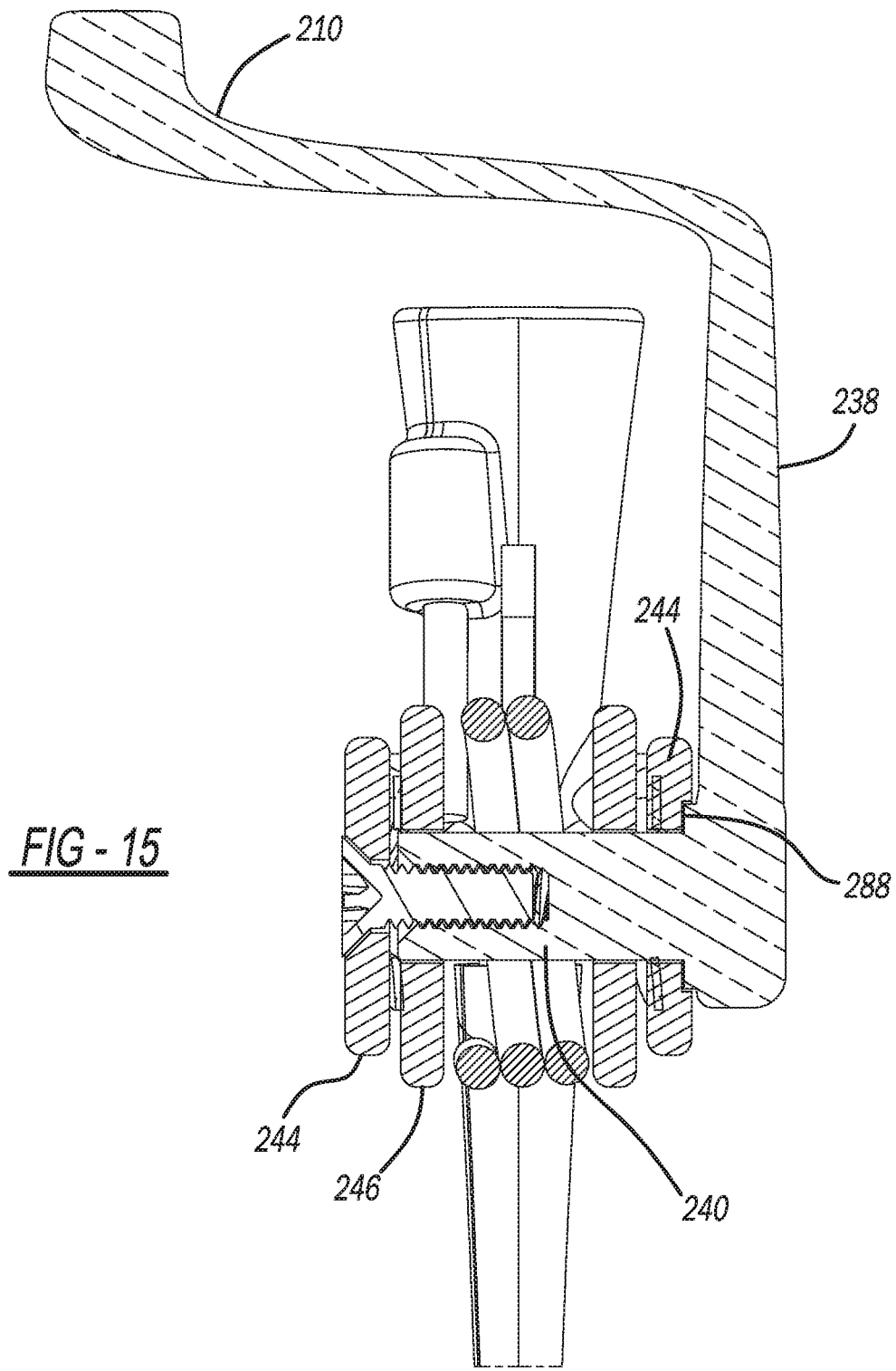
FIG. 15 is a sectional of the dental crown remover jaws taken along lines 15-15 of FIG. 13.

Referring to FIGS. 9 to 16, an alternate preferred embodiment dental crown remover 217 is provided. Dental crown remover 217 has a tool adaptor 210 with a post extension 212. Post extension 212 has a cylindrical head 214 that rotationally fits within a collet 215 to allow the tool adaptor 210 to rotate with respect to the handle 219. Dental crown remover 217 has an inner jaw 220 and outer jaw 222 substantially similar to that of the dental crown remover 7 previously described. The tool adaptor 210 has a lateral arm 250 that extends a distance 234 lateral of the post first axis 232 (FIG. 14).

The jaws 220 and 222 pivot in a plane 236 that is parallel to the axis 232. Plane 236 is more adjacent to axis 232 than the extension arm 238. However, plane 236 is closer to extension arm 238 than it is to axis 232. In a manner similar to the dental crown remover 7 previously described, dental crown remover 207 has unitary pivotal connection with the pivot arm 240. Unitary pivotal connection refers to the jaws 220 and 222 pivoting as a single unit about the pivot arm 240 when the jaws 220, 222 are spring biased together.

If one of the jaws 220, 222 is engaged with a tooth, the other jaw can be independently pivoted about the pivot arm 240. Wave washers 242 are positioned between eyelets 244 of jaw 220 and eyelets 246 of jaw 222. The wave washers 242 add angular friction to the rotational unitary pivotal connection of the jaws 220 and 222 on the pivot arm 240 to keep them from pivoting too freely. This can be adjusted to meet the desire of the dental professional utilizing the crown remover 207.

Figure 16:
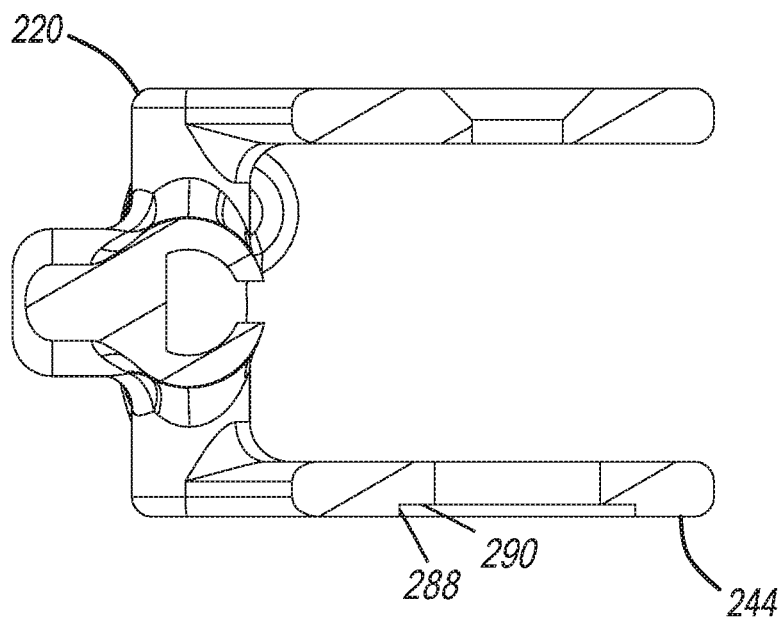
FIG. 16 is a sectional view taken through the eyelets of the lower jaw shown in FIG. 12.

Eyelet 244 on a side adjacent to post arm 238 has an annular indentation 290 to align with an annular shoulder 288 adjacent a base of the pivot arm 280 (FIG. 16). This shoulder/indentation fit further aligns the jaw 220 with the pivot arm 280.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A dental crown removal apparatus comprising:
   a handle for placement in an operator's hand;
   an elongated post projecting along a first axis, said post being connected for reciprocal motion with respect to said handle along said first axis;
   a motor in said handle for moving said post;
   a tool adapter connected with said post along an end of said post opposite said handle, said tool adapter having an extension arm extending away from said handle with a pivot arm connected with said extension arm spaced from said handle;
   first and second opposing jaws for gripping a dental crown, said jaws having claw ends spring biased together, said first and second jaws having independent and unitary pivotal connection with said pivot arm and, wherein the operator can adjust one of said jaws by adjusting said claw end of said jaw the claw end of said jaw outwardly by pivoting said jaw on the pivot arm against the spring biasing force, and;
   wherein said pivot arm has an axis perpendicular to an axis of said extension arm and to said first axis and said jaws pivot in a plane parallel to the first axis and to said extension arm axis.

2. The dental crown removal apparatus as described in claim 1, wherein said first and second jaws pivot in a plane bisecting said post.

3. The dental crown removal apparatus as described in claim 2, wherein both said first and second jaws pivotal connection with said pivot arm have eyelet pivotal connections with said pivot arm that are laterally separated from one another by said plane bisecting said post.

4. The dental crown removal apparatus as described in claim 1 wherein said extension arm is lateral of said first axis a first distance and said jaws pivot in a plane lateral of said first axis at a distance from said first axis less than said first distance, and wherein the jaws pivot plane is more adjacent to said extension arm than to said first axis.

5. The dental crown removal apparatus as described in claim 1 wherein said at least one of said first and second jaws has an eyelet to pivot on said pivot arm.

6. The dental crown removal apparatus as described in claim 5, wherein both of said first and second jaws have twin eyelets.

7. The dental crown removal apparatus as described in claim 6, wherein one of said twin jaw eyelets laterally fits within said twin eyelets of said other jaw.

8. The dental crown removal apparatus as described in claim 7 having a wave spring biasing a lateral position of at least one of said jaws with respect to said pivot arm.

9. The dental crown removal apparatus as described in claim 7, wherein one of said jaw eyelets laterally fits within said other jaw eyelets, and said jaw having eyelets fitting within eyelets of said other jaw has a tooth on the claw end juxtaposing two teeth on the claw end of said other jaw.

10. The dental crown removal apparatus as described in claim 1 wherein a torsion spring provides said spring biasing.

11. The dental crown removal apparatus as described in claim 1 wherein a spring providing said spring biasing of said claw ends together with said first and second jaws has ends nested in said first and second jaws.

12. The dental crown removal apparatus as described in claim 1 wherein one of said jaws has an adjustable length.

13. The dental crown removal apparatus as described in claim 1 wherein one of said jaw claw ends has a tooth that juxtaposes two teeth of said opposing jaw claw end.

14. The dental crown removal apparatus as described in claim 1 wherein a screw holds said jaws to said pivot arm.

15. The dental crown removal apparatus as described in claim 1 wherein a pivotal axis of said jaws intersects said post first axis.

16. The dental crown removal apparatus as described in claim 1 wherein said pivot arm can rotate with respect to said handle.

17. A dental crown removal apparatus as described in claim 1 wherein a frequency of reciprocal motion of said post is adjustable.

18. A dental crown removal apparatus comprising:
   a handle for placement in an operator's hand;
   an elongated post projecting along a first axis, said post being connected for reciprocal motion with respect to said handle along said first axis;
   a motor in said handle for moving said post;
   a tool adapter connected with said post along an end of said post opposite said handle, said tool adapter having a saddle for placement on said post, said tool adapter having an extension arm extending from said saddle, said tool adapter having a pivot arm perpendicularly connected with said extension arm with an axis of said pivot arm perpendicular to an axis of said extension arm and spaced from said handle;
   an upper jaw for gripping a dental crown, said upper jaw having a pivotal connection with said pivot arm;
   a lower jaw for gripping a dental crown, said lower jaw opposing said upper jaw, said lower jaw having a pivotal connection with said pivot arm;

a spring biasing a claw end of said jaws together; and wherein said upper and lower jaws pivot in a plane parallel with said first axis and parallel to said axis of said extension arm and said upper and lower jaws pivotal plane bisects said post and said jaws having a pivotal axis intersecting said first axis.

19. The dental crown removal apparatus as described in claim 18 wherein said saddle can rotate on said post.

20. A dental crown removal apparatus comprising:

a handle for placement in an operator's hand;

an elongated post projecting along a first axis, said post being connected for reciprocal motion with respect to said handle along said first axis;

a motor in said handle for moving said post;

a tool adapter connected with said post along an end of said post opposite said handle, said tool adapter being rotatable with respect to said handle, said tool adapter having an extension arm extending away from said handle, said tool adapter having a cylindrically-shaped pivot arm perpendicularly connected with said extension arm and spaced from said handle;

an upper jaw for gripping a dental crown, said upper jaw having a pivotal connection with said pivot arm via twin spaced apart eyelets;

an adjustable length lower jaw for gripping a dental crown, said lower jaw opposing said upper jaw, said lower jaw having a pivotal connection with said pivot arm via twin eyelets, said upper jaw eyelets laterally fitting within said lower jaw eyelets;

a torsion spring biasing a claw end of said jaws together, said torsion spring having a coil portion encircling said pivot arm; and wherein said upper and lower jaws pivot in a plane that is parallel with and laterally offset from said first axis and said upper and lower jaws twin eyelet pivotal connections with said pivot arm having independent and unitary pivotal connection with said pivot arm.

21. A dental crown removal apparatus comprising:

a handle for placement in an operator's hand;

an elongated post projecting along a first axis, said post being connected for reciprocal motion with respect to said handle along said first axis;

a motor in said handle for moving said post;

a tool adapter connected with said post along an end of said post opposite said handle, said tool adapter having an extension arm extending away from said handle with a pivot arm connected with said extension arm spaced from said handle;

first and second opposing jaws for gripping a dental crown, said jaws having claw ends spring biased together, said first and second jaws having independent and unitary pivotal connection with said pivot arm and, wherein the operator can adjust one of said jaws by adjusting said claw end of said jaw the claw end of said jaw outwardly by pivoting said jaw on the pivot arm against the spring biasing force, and;

wherein said extension arm is lateral of said first axis a first distance and said jaws pivot in a plane lateral of said first axis at a distance from said first axis less than said first distance, and wherein the jaws pivot plane is more adjacent to said extension arm than to said first axis.

22. The dental crown removal apparatus as described in claim 21, wherein said first and second jaws pivot in a plane parallel with said first axis.

* * * * *